United States Patent Office 3,361,786
Patented Jan. 2, 1968

3,361,786
PROCESS FOR PREPARING α,β-UNSATURATED
COMPOUNDS
Walter Fink, Zurich, Switzerland, assignor to Monsanto
Company, St. Louis, Mo., a corporation of Delaware
No Drawing. Filed Jan. 21, 1965, Ser. No. 427,166
4 Claims. (Cl. 260—465.7)

This application is a continuation-in-part of copending application Ser. No. 127,816, filed July 31, 1961, now abandoned. The present invention relates to a process for preparing α,β-unsaturated compounds by splitting off a halogen acid with potassium fluoride from compounds which have at least one α-hydrogen atom and at least one β-halogen atom to an activating group.

The compounds from which the α,β-unsaturated compounds are made are of the general formula A—CHRCXR'R" wherein X is a halogen atom, preferably a chlorine atom, R, R' and R" are hydrogen, halogen, or aliphatic hydrocarbon radicals, preferably aliphatic hydrocarbon radicals having not more than 8 carbon atoms; and A is the —COOH, a —COOR''', the —CN, the —CONH$_2$ or the —CH=CH$_2$ radical, where R''' is usually a hydrocarbon radical having not more than 22 carbon atoms and preferably an aliphatic hydrocarbon radical.

A number of methods are known for dehydrohalogenation, especially for the dehydrochlorination, starting from α,β-dichloro compounds. Thus, the dehydrohalogenation has been effected under conditions mentioned below by the use of one of the following catalysts: in aqueous solutions or suspension, acid agents like K$_2$SO$_4$, H$_3$PO$_4$; alkaline agents like NaOH, Na$_2$CO$_3$, NaHCO$_3$, etc. (U.S. 2,245,547, U.S. 2,434,229 and German 1,078,100); sodium acetate (U.S. 2,476,528); organic bases and amino acids (German 855,553 and 883,891); dialkali-metal-, di-ammonium-, or alkali metal ammonium phosphates or arsenates (British 723,547). In alcohol solutions, sodium hydroxide (U.S. 1,864,884); sodium acetate (Angew. Chem., 60, 311 (1948)).With the exclusion of water, sodium carbonate in a polar solvent (Belgium 574,233); carboxylic acid amide, carboxylic acid nitrile or carboxylic acid imide (German 1,021,357); primary, secondary or tertiary amines (German 1,064,502). With the exclusion of water in the gaseous state, aluminum oxide clay or carbon black at 200–550° C., carboxylic acid amides, carboxylic acid nitriles or amines at 220–550° C. (German 1,076,673).

Most of the enumerated methods have practical importance for the dehydrohalogenation of α,β-dichloropropionic acid esters and -nitriles and the given references are pertaining to such processes; however, these methods have one or several of the following disadvantages: hydrolysis of groups which may be present such as for example ester, amide, carboxylic acid halide, carboxylic acid anhydride, phosphorus halide, etc.; cleavage of metal organo bonds, bad yields, decarboxylation of unstable carboxylic acids, such as for example acetylene dicarboxylic acid; production of cycloaliphatic rings; isomerization; formation of alkoxy derivatives; use of expensive solvents and catalysts, difficult separation of reaction mixtures, discoloration of polymers manufactured thereof, need of polymerization inhibitors.

The problem of producing α,β-unsaturated compounds by a practical process which is applicable to the production of compounds having a variety of structures has heretofore remained unsolved.

Now it has been found that halogen acid can be eliminated from compounds which possess in β-position to a halogen atom an activating group A as described above and a hydrogen atom α to this activating group A by reaction with potassium fluoride at relatively low temperatures, preferably in the absence of water. Furthermore, the organic catalysts which have been used previously are expensive; whereas, the potassium fluoride catalyst of the invention is relatively inexpensive and a surprisingly efficient catalyst. Potassium fluoride as well as its addition product with hydrogen fluoride can easily be separated from the reaction mixture since these compounds are insoluble and non-volatile even at high temperatures. The potassium fluoride catalyst is a very durable catalyst and can be used and regenerated indefinitely. A potassium fluoride catalyst causes no discoloration of the reaction products and of the polymers produced therefrom. At 80° C., which is about half of the commonly used reaction temperature, one obtains a yield of 100% pure α-chloroacrylic acid ester (see Example 7 hereinbelow). It is surprising that in this new process the addition of a special polymerization inhibitor is not necessary even at temperatures up to about 150° C. because the salts which are present in the reaction mixture apparently are very efficient for this purpose. It has been reported in German Patent No. 952,803 that vinylsulfonic acid fluoride can be obtained by treating β-chloroethanesulfonic acid or -chloride with KF; but the general application of this process has not been evident until now.

The process of the invention proceeds as follows:

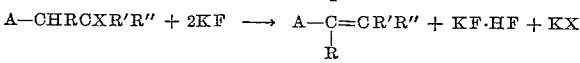

wherein A, X, R, R' and R" are as defined hereinabove.

A class of compounds which has considerable importance for carrying out the new process, consists of easily available compounds possessing also in the α-position a halogen atom, especially a chlorine atom. The manufacture of such dihalogeno compounds by adding halogen to the corresponding α,β-unsaturated cyano, carbonyl compounds, etc., or to conjugated dienes, etc. is well known. The most important of these reactants or starting compounds for the process of the invention are α,β-dichloropropionic acid,, α,β-dichloropropionic acid esters, α,β-dichloropropionamide, α,β-dichloropropionitrile and 3,4-dichlorobutene-1. On the dehydrohalogenation of these compounds one halogen atom remains and α-chloroacrylic acid, α-chloroacrylic acid esters, α-chloroacrylamide, α-chloroacrylonitrile and 2-chlorobutadiene-1,3, respectively are formed.

Carrying out the reaction the defined starting compounds are brought into intimate contact with at least twice the equivalent amount of potassium fluoride in a corrosion proof vessel. The reaction can be carried out with or without a solvent. In certain cases a solvent for potassium fluoride may be favorable such as acetamide, N-methyl-acetamide, dimethylformamide, polyvalent alcohols, etc. For carrying out the reaction, temperatures in the range from about 60–200° C. are preferred. The reaction time is in the range of about 3–8 hours. A polymerization inhibitor will normally not be necessary to temperatures up to about 150° C. It is particularly desirable, if feasible, for the particular reactant and product to separate continuously the unsaturated product compound from the reaction mixture by distillation, preferably under reduced pressure. The KX and KF salts by-product can be separated from the reaction mixture by filtration. The reaction products prior to filtration containing the salts, can even be polymerized directly without salt removal and worked up into foils, which can be converted by lavage with water into more or less microporous foils according to the salt content.

In Table 1 below is shown a comparison of the new dehydrohalogenation process of α,β-dichloropropionic acid ester using KF and of some of the processes using other organic catalysts.

TABLE 1.—DEHYDROCHLORINATION OF α,β-DICHLOROPROPIONIC ACID ESTER

| Number | Addition | Time (hrs.) | Conversion (percent) | Parts | Yield (percent) |
|---|---|---|---|---|---|
| Example a | 5 n-Butylpyrrolidine | 6 | 78 | 70.9 | (91) |
| Example b | 0.6 Phenothiazine | 6 | 67 | 66 | (98.5) |
| Example c | 2 Quinoline | 10 | 50 | 46 | (92) |
| Example 7 (herein) | | 7 | 100 | 100 | (100) |

Example 7

100 g. of α,β-dichloropropionic acid ethyl ester are strongly stirred with 68 g. of powdered potassium fluoride (molar ratio 1:2) at 80° C. for 7 hours. Then the α-chloroacrylic acid ethyl ester which is formed is distilled off in vacuum. Yield: 78.7 g. of colorless liquid.

The fractionation shows that it consists of 100% pure α-chloroacrylic acid ester. If, for example, n-dodecyl α,β-dichloropropionate or oxo-tridecyl α,β-dichloropropionate is used in the method of Example 7 rather than ethyl α,β-dichloropropionate, the resulting products are n-dodecyl α-chloroacrylate and oxo-tridecyl α-chloroacrylate, respectively. A temperature in the range of about 70–90° C. is especially suitable for carrying out the dehydrochlorination of the α,β-dichloropropionates.

Examples 1–12

It is proceeded as indicated in Example 7, thereby the reaction temperature and/or time are varied. In three examples acetamide as a solvent and phenothiazine as a polymerization inhibitor are used. The temperatures mentioned are temperatures of reaction vessel. The results are shown in the following Table 2.

TABLE 2.—DEHYDROCHLORINATION OF α,β-DICHLOROPROPIONIC ACID ETHYL ESTER

| No. | (I) Parts | Temp.,° C. | Time, (hrs.) | (II) Parts | (I) percent back | Addition Parts | Yield (percent) | (0) |
|---|---|---|---|---|---|---|---|---|
| 1 | 100 | 30 | 5 | 0 | 92.0 | | 0 | (0) |
| 2 | 100 | 50 | 5 | 24.3 | 66.2 | | 31.0 | (91.5) |
| 3 | 100 | 50 | 5 | 29.5 | 59.9 | 34 Acetamide | 37.5 | (93.5) |
| 4 | 100 | 80 | 3 | 15.7 | 78.2 | | 20.0 | (91.5) |
| 5 | 100 | 80 | 5 | 42.0 | 40.1 | | 53.5 | (89.2) |
| 6 | 100 | 80 | 5 | 53.8 | 30.2 | 34 Acetamide | 68.5 | (98.5) |
| 7 | 100 | 80 | 7 | 78.7 | 0 | | 100 | (100) |
| 8 | 100 | 110 | 5 | 53.5 | 30.5 | | 68.0 | (97.5) |
| 9 | 100 | 150 | 5 | 65.4 | 14.8 | | 83.0 | (97.5) |
| 10 | 100 | 150 | 5 | 0 | 0 | 34 Acetamide | 0 | (0) |
| 11 | 100 | 200 | 5 | 46.3 | 0 | | 59.0 | (59.0) |
| 12 | 100 | 200 | 5 | 68.4 | 11.1 | 1 Phenothiazine | 87.0 | (98.0) |

(I)=α,β-Dichloropropionic acid ester.
(II)=α-Chloroacrylic acid ester.
(0)=In parentheses: Yield based on conversion.

Example 20

100 g. of α,β-dichloropropionitrile and 92 g. of KF (molar ratio 1:2) are stirred at a bath temperature of 140° C. for 5 hours in a flask which is provided with a reflux condenser. Then, the reaction product is fractionally distilled. Yield: 55.9 g. of α-chloroacrylonitrile and 17.5 g. α,β-chloropropionitrile (=79% or 95.8% based on the conversion respectively).

Example 18

A fraction with B.P. 86–87° C. is continuously distilled off within 2 hours from the reaction mixture specified in Example 20 and using the same conditions.

Example 13–21

It is proceeded as mentioned in Example 20, thereby the reaction temperature and/or time are varied. In three examples phenothiazine as a polymerization inhibitor is used. The results are shown in the following Table 3.

TABLE 3.—DEHYDROCHLORINATION OF α,β-DICHLOROPROPIONITRILE

| No. | (III) Parts | Temp., ° C. | Time (hrs.) | (IV) Parts | (III) Percent back | Addition Parts | Yield, (percent) | (0) |
|---|---|---|---|---|---|---|---|---|
| 13 | 100 | 100 | 5 | 23.7 | 65.0 | | 33.5 | (95.7) |
| 14 | 100 | 100 | 5 | 14.7 | 75.7 | 1 Phenothiazine | 20.8 | (85.2) |
| 15 | 100 | 120 | 5 | 47.0 | 31.0 | | 67.8 | (98.4) |
| 16 | 100 | 120 | 5 | 27.0 | 59.0 | 1 Phenothiazine | 39.2 | (93.2) |
| 17 | 100 | 140 | 2 | 20.7 | 69.0 | | 28.5 | (92.0) |
| 18(+) | 100 | 140 | 2 | 58.4 | 9.2 | | 83.5 | (92.0) |
| 19 | 100 | 140 | 3 | 31.2 | 54.8 | | 43.0 | (95.1) |
| 20 | 100 | 140 | 5 | 55.9 | 17.5 | | 79.0 | (95.8) |
| 21 | 100 | 140 | 5 | 35.0 | 40.8 | 1 Phenothiazine | 49.5 | (83.1) |

(III)=α,β-Dichloropropionitrile.
(IV)=α-Chloroacrylonitrile.
(0) In parentheses: Yield based on conversion.
(+) Reaction product continuously distilled off.

Although the invention has been described in terms of specified embodiments which are set forth in considerable detail, it should be noted that this is by way of illustration only and that the invention is not necessarily limited thereto since alternative embodiments will become apparent to those skilled in the art in view of the disclosure. Accordingly, modifications are contemplated which can be made without departing from the spirit of the described invention.

What is claimed is:

1. A process for preparing α,β-unsaturated compounds of the formula

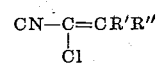

wherein R′ and R″ are selected from the class consisting of hydrogen, chlorine and alkyl having not more than 8 carbon atoms, comprising reacting a compound of the formula CNCHClCClR′R″ wherein R′ and R″ are as defined hereinabove, with at least twice the molar amount of potassium fluoride based on the compound

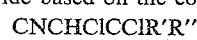

at a sufficiently high temperature in the range of about

50–200° C. to cause dehydrochlorination and for a time in the range of about 2 to 10 hours.

2. A process of claim 1 wherein reaction products formed are continuously distilled off from the reaction mixture.

3. A process of claim 1 wherein a polymerization inhibitor is added to the reaction mixture.

4. A process of claim 1 wherein R' and R'' are hydrogen atoms.

References Cited

Nesmeyanov et al.: C.A., 42, 1948, pp. 4924–4925.
Kitano et al.: C.A., 50, 1956, p. 3995.
Kitano et al.: C.A., 53, 1959, p. 7969.

JOSEPH P. BRUST, *Primary Examiner.*